United States Patent
Beck

(10) Patent No.: US 6,848,533 B2
(45) Date of Patent: Feb. 1, 2005

(54) DRIVE SYSTEM FOR TANDEM AXLES

(75) Inventor: Hermann Beck, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 25 days.

(21) Appl. No.: 10/352,271

(22) Filed: Jan. 27, 2003

(65) Prior Publication Data
US 2003/0192733 A1 Oct. 16, 2003

(30) Foreign Application Priority Data
Apr. 10, 2002 (DE) .......................................... 102 15 692

(51) Int. Cl.[7] .............................................. B60K 17/16
(52) U.S. Cl. ..................................................... 180/378
(58) Field of Search ................................ 180/378, 379, 180/385, 377

(56) References Cited

U.S. PATENT DOCUMENTS

| | | | |
|---|---|---|---|
| 5,417,297 A | 5/1995 | Auer ........................ | 180/24.11 |
| 5,443,430 A * | 8/1995 | Parsons ........................ | 475/248 |
| 6,053,837 A | 4/2000 | Auer ........................... | 475/221 |
| 6,089,357 A * | 7/2000 | Jackson et al. ............ | 188/71.6 |
| 6,478,706 B1 * | 11/2002 | Crabb .......................... | 475/18 |

FOREIGN PATENT DOCUMENTS

| | | | | |
|---|---|---|---|---|
| DE | 25 22 542 | | 3/1979 | ........... B60K/17/36 |
| DE | 41 20 801 C2 | | 8/1993 | ........... B60K/17/36 |
| EP | 0 520 389 | | 6/1992 | ........... B60K/17/36 |
| EP | 0 909 671 A2 | | 10/1998 | ........... B60K/17/36 |

* cited by examiner

Primary Examiner—Faye M. Fleming
(74) Attorney, Agent, or Firm—Davis & Bujold, P.L.L.C.

(57) ABSTRACT

In a drive system for tandem axles a prime mover (1) drives a reduction gear (2) in the housing (4) of which one differential (6), service brakes (7) and planetary gears (8) are situated. The output of the reduction gear (2) is connected, via universal shafts, in an easy manner with the drive train of the tandem housing (3). It is thus possible to situate the tandem housing (3) in the vehicle chassis (10).

6 Claims, 2 Drawing Sheets

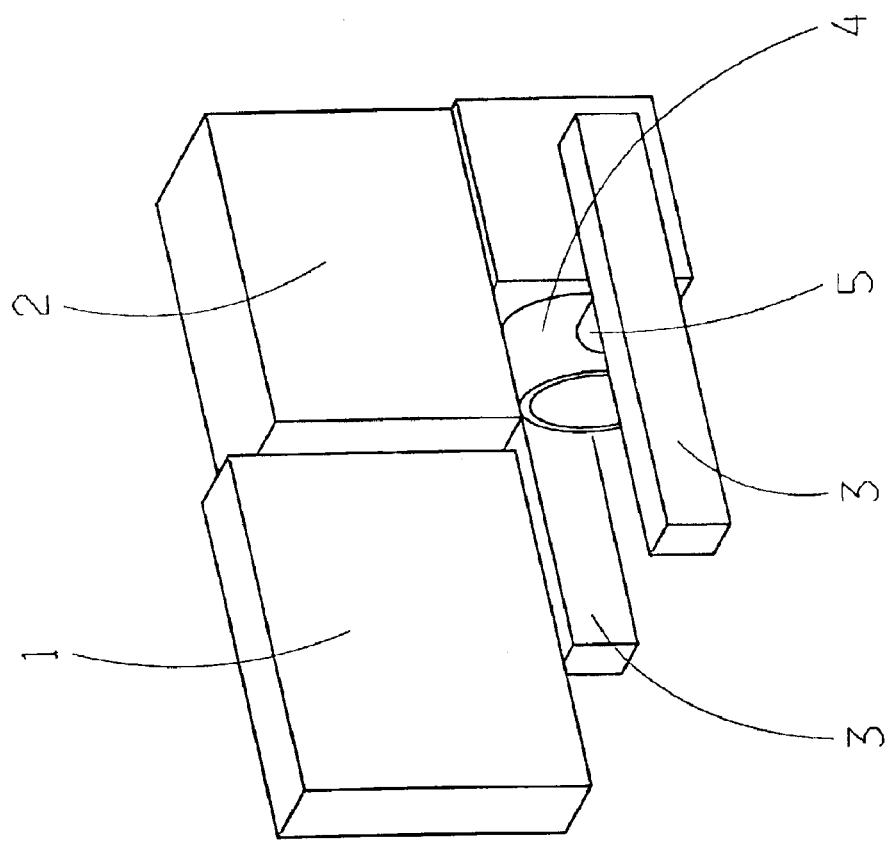

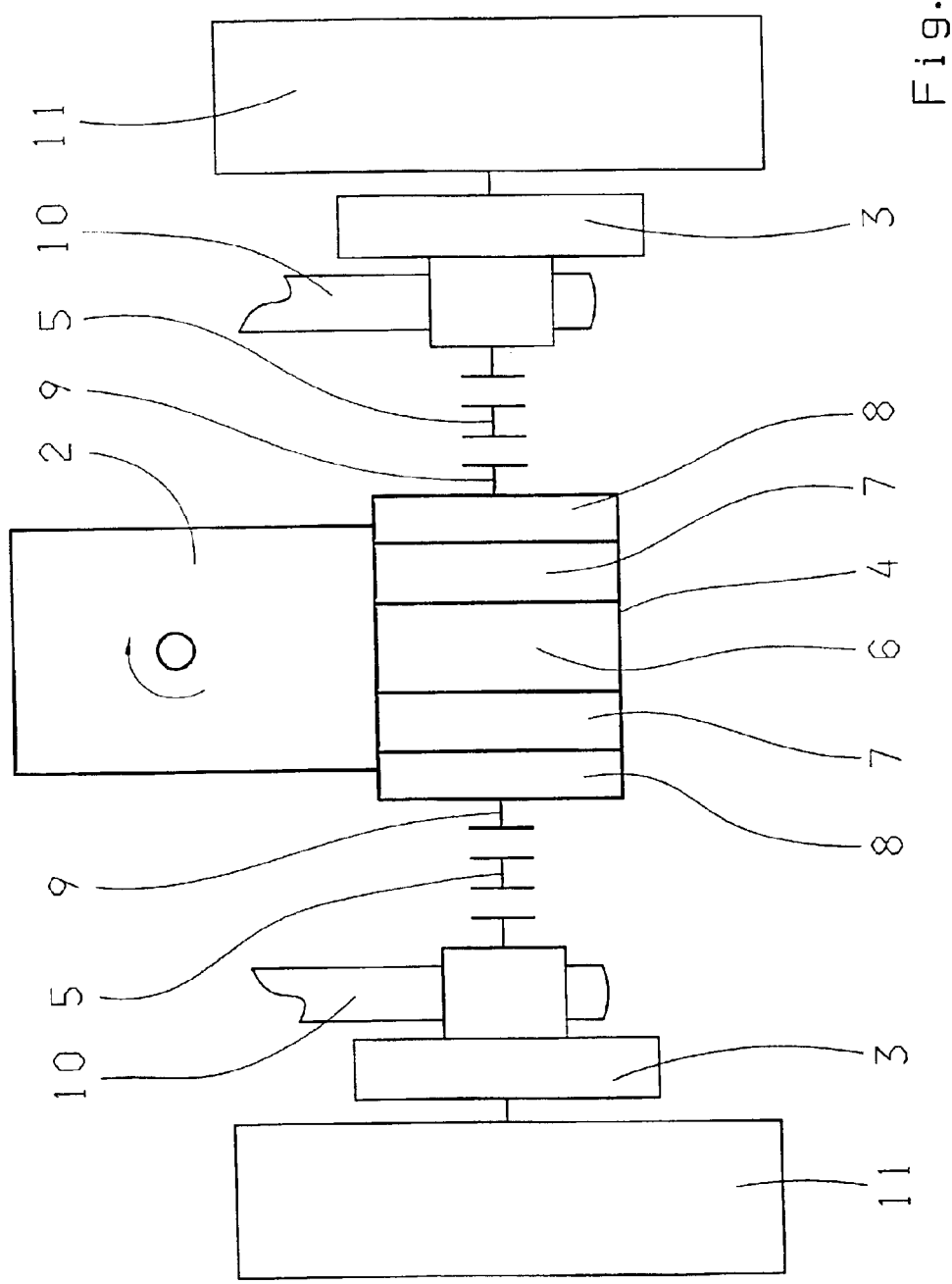

DRIVE SYSTEM FOR TANDEM AXLES

FIELD OF THE INVENTION

The invention relates to a drive system for tandem axles.

BACKGROUND OF THE INVENTION

Tandem axles are often used in working machines such as graders and forest tractors. On each side of the mid-section of an axle, a tandem housing carrying the driving wheels is connected. A differential and rear-mounted service brakes are often situated in the mid-section of the axle. The wheels on the front axle, such as in graders, are often driven by hydrostatic engines.

DE 41 20 801 C2 discloses a drive system for tandem axles where one axle mid-section always supports the tandem housing and has one differential and service brakes. On the tandem housings, wheel hubs are held which accommodate the driving wheels. The differential, which is located in the mid-section of the axle, is driven via a universal shaft. The transportation and installation of the whole tandem axle, which consists of the axle mid-section and the two tandem housings, is very costly and when the tandem axle is used in different vehicles each time at least the axle mid-section has to be changed.

The problem on which this invention is based is to provide a drive system for tandem axles which stands out by a compact mounting and a simple assembly in the vehicle.

The problem is solved by a drive system for tandem axles according to the preamble and including also the characteristic features of the main claim.

SUMMARY OF THE INVENTION

According to the invention, a prime mover drives a reduction gear. The reduction gear can be designed as a mechanical transmission with or without a hydrodynamic torque converter, as a power distribution gear having, for example, one hydrostatic and one mechanical power branch, or as a hydrostatic transmission. The output of the gear is directly connected with a differential on the output sides of which service brakes are situated. The differential and the service brakes are located in one housing directly connected with the housing of the reduction gear. It is also possible to design the housing of the reduction gear and the housing where the differential and the service brakes are situated integrally. Preferably planetary gears and rear-mounted on the service brakes and are likewise situated in the housing where the differential and the service brakes are placed. The differential is preferably designed as a non-slip differential which can be controlled by the gear control at the same time. The tandem housings are directly supported in the chassis of the vehicle, the drive train being non-rotatably connected in the tandem housings via universal shafts with the output of the differential. The reduction gear preferably has a front drive which makes situating the prime mover above the tandem housing possible. By the differential, the service brakes and optionally a differential lock, which is the same as rear-mounted planetary gears being integratedly disposed on the gear output, it is possible easily to install the complete tandem housing with its drive train in the chassis and connect them via universal shafts with the gear. The installation, the same as the transportation and mounting of the structural parts, are hereby considerably simplified. With the gear being directly located between the tandem housings, the drive system can be designed more compact, since no more space needs be available between the axle mid-section and the gear for eventually required universal shafts. The service brakes, which in an integrated manner are disposed in the tandem housing, can also be designed as wet-running multi-disc brakes cooled by the lubricant of the gear. A separate cooling circuit for the service brakes is thus eliminated.

BRIEF DESCRIPTION OF THE DRAWINGS

The invention will now be described, by way of example, with reference to the accompanying drawings in which:

FIG. 1 is a spatial representation of the arrangement of the drive system; and

FIG. 2 is a diagrammatic arrangement of the differential of the service brake and planetary gears.

DETAILED DESCRIPTION OF THE INVENTION

FIG. 1:

A prime mover 1 drives a reduction gear 2. In the reduction gear 2 is a front drive, not shown, which makes it possible to dispose the output of the gear above the height of the tandem housing 3. The reduction gear 2 has a housing part 4, on its output, which is either connected with the main housing of the reduction gear 2 or made integrally with it. At least one differential and service brakes are situated in the housing part 4. The output of the housing part 4 is connected with the drive train in the tandem housings 3 via universal shafts 5. The tandem housings 3 are supported directly by a chassis of the vehicle (not shown). A compact drive system for tandem axles is thus provided in which the reduction gear 2 is disposed between the tandem housings 3 and in which the prime mover 1 can be situated above the tandem housing 3 and thus a compact drive results in the longitudinal direction and in the transverse direction.

FIG. 2:

A prime mover, not shown, drives a reduction gear 2 can be designed, for example, as a powershift transmission with or without a torque converter or as a continuously variable transmission. A differential 6, which can also be lockably designed, is situated in a housing part 4 of the reduction gear 2. Service brakes 7 are connected with the outputs of the differential 6. Planetary gears 8 are rear-mounted on the service brakes 7. Universal shafts 5, which actuate the drive train of the tandem housings 3, are connected with the output 9. The tandem housings 3 are supported by the vehicle chassis 10 and carry the driving wheels 11 of the vehicle. When a lockable differential 6 is used, it is controlled by control of the reduction gear 2. It is thus possible, in a simple manner, to install the tandem housing 3 in the vehicle and dispose it in different positions of the vehicle.

As described above, the service brakes and the differential are housed in a housing that is either an integral part of the reduction gear housing or that is connected to and thus forms a part of the reduction gear housing, thereby comprising a unitary volume in which the service brakes (7) may be cooled by the coolants for the reduction gear.

| Reference numerals | |
| --- | --- |
| 1 | prime mover |
| 2 | reduction gear |
| 3 | tandem housing |

-continued

| Reference numerals | |
|---|---|
| 4 | housing part |
| 5 | universal shaft |
| 6 | differential |
| 7 | service brakes |
| 8 | planetary gears |
| 9 | output |
| 10 | vehicle chassis |
| 11 | driving wheels |

What is claimed is:

1. A drive system for tandem axles comprising:

a reduction gear (2) having an input and an output;

a prime mover (1) connected to the input of the reduction gear (2);

a plurality of driving wheels (11) connected to the output (9) of the reduction gear (2) via a differential (6);

a service brake (7) connected with each output of the differential (6); and tandem housings (3) for connecting the plurality of driving wheels (11) to a vehicle chassis (10) and for connecting each driving wheel to a corresponding output of the differential through a corresponding universal shaft;

wherein the differential (6) and each service brake (7) are located in a housing (4) which is one of connected with and designed integrally with the reduction gear (2), and each tandem housing and corresponding driving wheel is a separate and independent unit from the housing of the differential and each service brake.

2. The drive system for tandem axles according to claim 1, wherein the differential (6) and each service brake (7) has a planetary gear (8) rear-mounted thereto.

3. The drive system for tandem axles according to claim 2, wherein each planetary gear (8) is situated in the housing (4) of the reduction gear (2).

4. The drive system for tandem axles according to claim 1, wherein each tandem housing (3) is directly supported by the vehicle chassis (10).

5. The drive system for tandem axles according to claim 1, wherein the service brakes (7) are cooled by coolants for the reduction gear (2).

6. The drive system for tandem axles according to claim 1, wherein the differential (6) is a non-slip differential which is controlled by control of the reduction gear (2).

* * * * *